United States Patent
Yuan

(10) Patent No.: US 11,621,614 B2
(45) Date of Patent: Apr. 4, 2023

(54) HIGH-PRECISION MINIATURE SERVO WITH NEW VARIABLE RELUCTANCE AND IMPROVED MOTOR POSITIONING

(71) Applicant: Xingping Yuan, Dongguan (CN)

(72) Inventor: Xingping Yuan, Dongguan (CN)

(*) Notice: Subject to any disclaimer, the term of this patent is extended or adjusted under 35 U.S.C. 154(b) by 288 days.

(21) Appl. No.: 17/035,781

(22) Filed: Sep. 29, 2020

(65) Prior Publication Data

US 2021/0013780 A1 Jan. 14, 2021

(30) Foreign Application Priority Data

Sep. 18, 2020 (CN) .......................... 202010985146.1

(51) Int. Cl.
| | |
|---|---|
| *H02K 5/04* | (2006.01) |
| *H02K 11/215* | (2016.01) |
| *H02K 7/116* | (2006.01) |
| *H02K 11/27* | (2016.01) |
| *H02K 7/108* | (2006.01) |

(52) U.S. Cl.
CPC ............ *H02K 11/215* (2016.01); *H02K 5/04* (2013.01); *H02K 7/108* (2013.01); *H02K 7/116* (2013.01); *H02K 11/27* (2016.01)

(58) Field of Classification Search
CPC ........ H02K 5/04; H02K 7/116; H02K 11/215; H02K 11/27
See application file for complete search history.

(56) References Cited

U.S. PATENT DOCUMENTS

| | | | |
|---|---|---|---|
| 6,211,794 B1* | 4/2001 | DeSoto ................. | G01D 5/145 340/686.3 |
| 8,393,989 B2* | 3/2013 | Pohl ....................... | F16H 15/52 475/196 |
| 8,957,559 B2* | 2/2015 | Schneider ............. | H02K 7/116 310/43 |
| 2021/0031943 A1* | 2/2021 | Yuan ..................... | F16M 11/18 |

* cited by examiner

Primary Examiner — Dang D Le

(57) ABSTRACT

The present disclosure relates to the field of servos, and in particular to a high-precision miniature servo with a new variable reluctance and improved motor positioning. Compared with conventional variable reluctances, the variable reluctance of the present disclosure has a longer service life, is lower in cost and is easier to machine. The motor component is directly assembled on the housing, so that the cost and space are saved, and the difficulty in mounting and positioning a miniature motor is mainly solved. A motor brush piece and the Ball element are directly machined on a PCBA circuit board, so that the problem on the difficulty and cost control of the conventional machining technology is solved.

8 Claims, 5 Drawing Sheets

HIGH-PRECISION MINIATURE SERVO WITH NEW VARIABLE RELUCTANCE AND IMPROVED MOTOR POSITIONING

TECHNICAL FIELD

The present disclosure relates to the field of servos, and in particular to a high-precision miniature servo with a new variable reluctance and improved motor positioning.

BACKGROUND

A conventional servo mainly includes a housing, a circuit board, a driving motor, a speed reduction gear and a position detection element. The operation principle of the conventional servo is as follows: a receiver sends a signal to the servo, the careless motor is driven to rotate by the IC on the circuit board, power is transferred to the output shaft through the speed reduction gear, and a signal is returned to the position detector on the output shaft to determine whether it has been positioned. The position detector is actually a variable resistor or a rotary magnetic encoder. During the rotation of the servo, the voltage value will also change, so that the angle of rotation can be obtained according to the detected voltage value.

At present, the servos popular in the market are in various shapes and of various types. However, the main functional modules in the servos are basically the same. The main components and functions of the servos are as follows: the servo controller is an actuator of the whole control system; there are a central controller, a data memory, a driving module and the like in the servo controller; and, the mainboard of the central controller is a single-chip microcomputer which allows manual writing of language programs to realize directional control.

To improve the flight performance of robots, a DC servo servo is used in many robot products to allow the robots to have better action control effects. However, in some of the existing DC servo servos, it is difficult to mount and position the motors of some servos, the machining technology is relatively difficult, and the machining cost is relatively high, so that the servos have certain limitations when in use. In addition, the variable reluctance of the conventional servos has a short service life, high cost and complicated machining technology.

SUMMARY

To solve the above problems, the present disclosure provides a high-precision miniature servo with a new variable reluctance and improved motor positioning, which uses a new positioning detection mode, allows simple mounting and positioning of a motor component and easier in machining and cost control.

For this purpose, the present disclosure employs the following technical solutions. A high-precision miniature servo with a new variable reluctance and improved motor positioning is provided, including a housing, an output shaft, and a motor component, a PCBA circuit board, a speed reduction device and a position detection assembly which are all mounted in the housing, wherein the motor component and the position detection assembly are electrically connected to the PCBA circuit board, respectively; the speed reduction device is in driving connection to the motor component; a positioning column hole for accommodating the motor component is formed in the housing, the motor component is directly mounted in the positioning column hole of the housing, and a motor brush piece is directly machined on the PCBA circuit board; the speed reduction device includes a speed reduction gear set and a clutch with a gear, with the speed reduction gear set being in driving connection to a rotating shaft of the motor component, the speed reduction gear set being meshed with the gear of the clutch, and the output shaft being meshed with the gear of the clutch through a gear; and, the position detection assembly includes a cam, a toggle magnet seat and a Hall element, with the cam being fixed to a lower end of the output shaft, the toggle magnet seat being fixed to the cam, the Hall element being directly machined in the PCBA circuit board, a magnet being arranged on the toggle magnet seat, and the output shaft driving the toggle magnet seat to move by the cam during its rotation so that the magnet moves in a linear direction above the Hall element to realize position detection.

Further, the toggle magnet seat includes a support block, a slider, a guide shaft and a telescopic spring; an upper end of the slider comes into contact with a lower end of the cam; an upper end of the support block is fixed inside the housing; one end of the guide shaft is connected to the support block, while the other end of the guide shaft is movably arranged in the slider; the telescopic spring is sleeved on the surface of the guide shaft, and one end of the telescopic spring is elastically connected to the support block while the other end of the telescopic spring is elastically connected to the slider; a clamping hole is formed in a lower end of the slider; and, the magnet is inserted and fixed in the clamping hole.

Further, the speed reduction gear set includes a first gear, a second gear and a third gear; the first gear is sleeved on the rotating shaft of the motor component; the second gear is meshed with the first gear, and the third gear is meshed with the second gear; a fourth gear, a fifth gear, a sixth gear and a seventh gear are successively arranged on the surface of the clutch from the top down; the first gear is meshed with the third gear; an eighth gear, a ninth gear and a tenth gear are successively arranged on the surface of the output shaft; and, the eighth gear, the ninth gear and the tenth gear are meshed with the fourth gear, the fifth gear and the sixth gear, respectively.

A signal and power connector is further provided on a side of the PCBA circuit board.

Further, the housing includes an upper cover, a middle cover and a lower cover successively from the top down; the PCBA circuit board is fixed in the lower cover; the motor component and the position detection assembly are arranged in the middle cover; the speed reduction device and the output shaft are arranged in the upper cover; and, the upper cover, the middle cover and the lower cover are screwed and fixed by a stud sequentially passing through the lower cover, the middle cover and the upper cover.

Extension portions are further arranged on two sides of the upper cover, and mounting holes are formed in the surface of the extension portions.

Further, a current overload protection function is provided in the PCBA circuit board by a software system, to realize automatic power-off in case of a current overload.

Further, a learning and repositioning function is provided in the PCBA circuit board by a software system, to enable learning of multiple times of positioning and storage of data for a next positioning.

The present disclosure has the following beneficial effects. In the high-precision miniature servo, the servo is miniaturized by the improved motor assembling, the Hall element, the magnet and other innovative designs. In the present disclosure, with the cam, the toggle magnet seat, the telescopic spring, the Hall element and the like, the magnet is allowed to move in a linear direction above the Hall element to form a variable reluctance for detection. Compared with the conventional variable reluctances, the variable reluctance of the present disclosure has a longer service life, is lower in cost and is easier to machine. The motor component is directly assembled on the housing, so the cost and space are saved, and the difficulty in mounting and positioning a miniature motor is mainly solved. The motor brush piece and the Hall element are directly machined on the PCBA circuit board, so that the problem on the difficulty and cost control of the conventional machining technology is solved. Meanwhile, by additionally providing a clutch in the speed reduction device, the gear is protected from instantaneous impact damage. In addition, by additionally providing a current overload protection function in the software system, the gears, the motor component and the PCBA circuit board are protected from damage due to an overload. Furthermore, by additionally providing a learning and repositioning function in the software, it is more intelligent.

DETAILED DESCRIPTION

The present disclosure will be further described below in detail by specific implementations with reference to the drawings. The present application may be implemented in various different forms, and is not intended to be limited to the implementations described in this embodiment. The following specific implementations are provided to facilitate a clearer and more thorough understanding of the disclosure of the present applications. The expressions indicating orientation, such as upper, lower, left and right, are merely for describing the position of the shown structure in the corresponding drawing.

Figure 1:
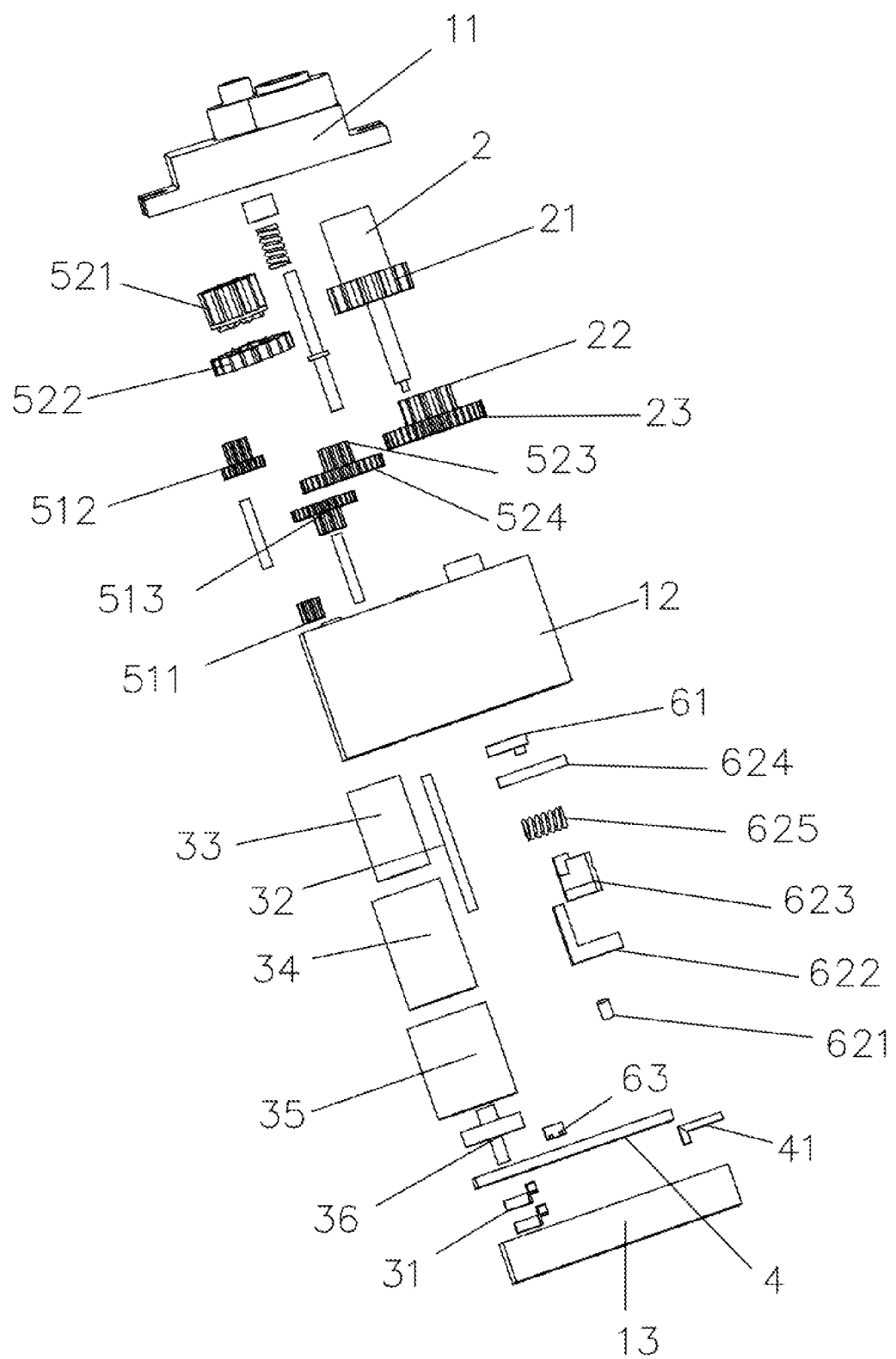
FIG. 1 is an exploded view of this embodiment.
Figure 2:
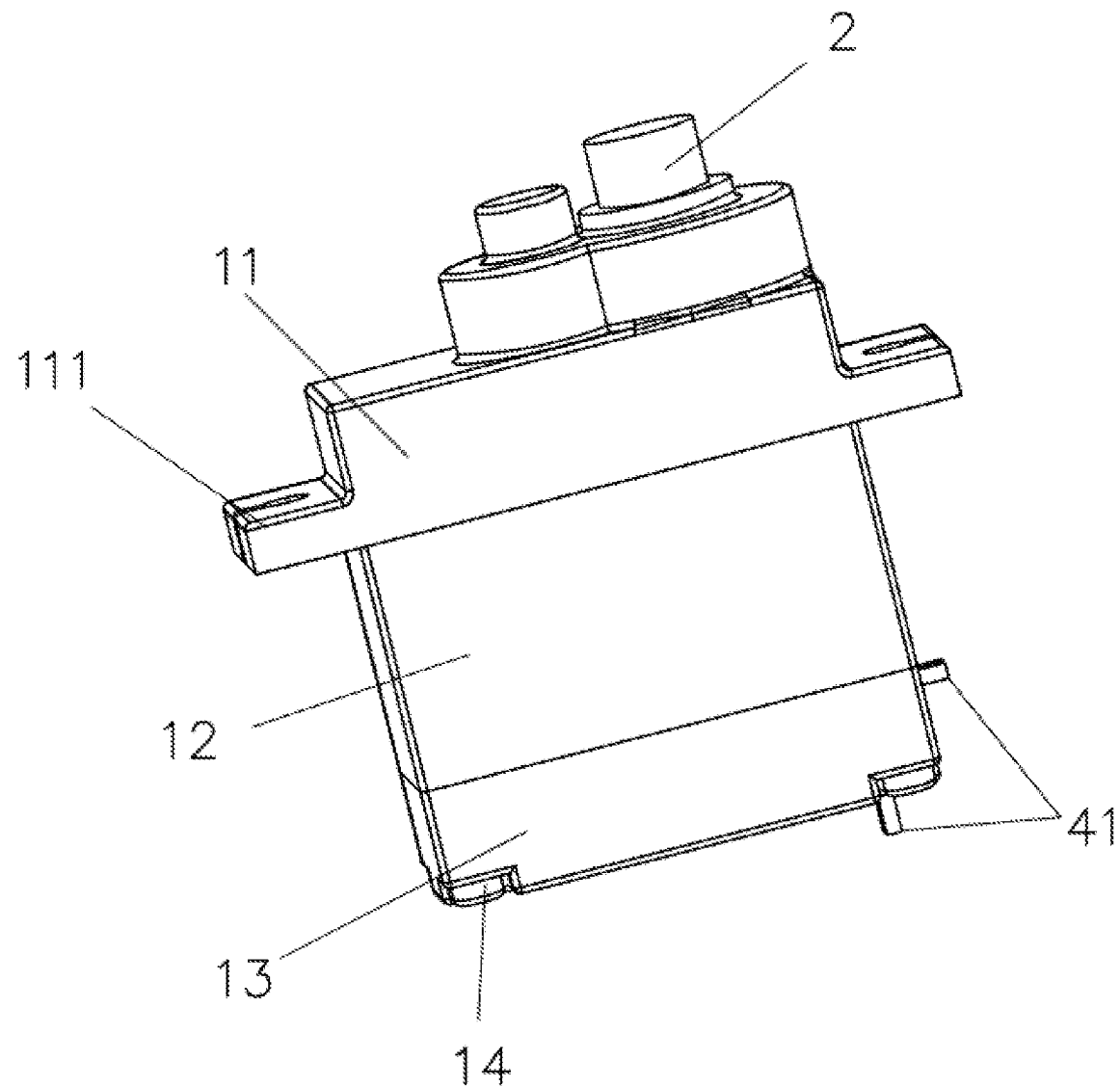
FIG. 2 is a perspective view of this embodiment.
Figure 3:
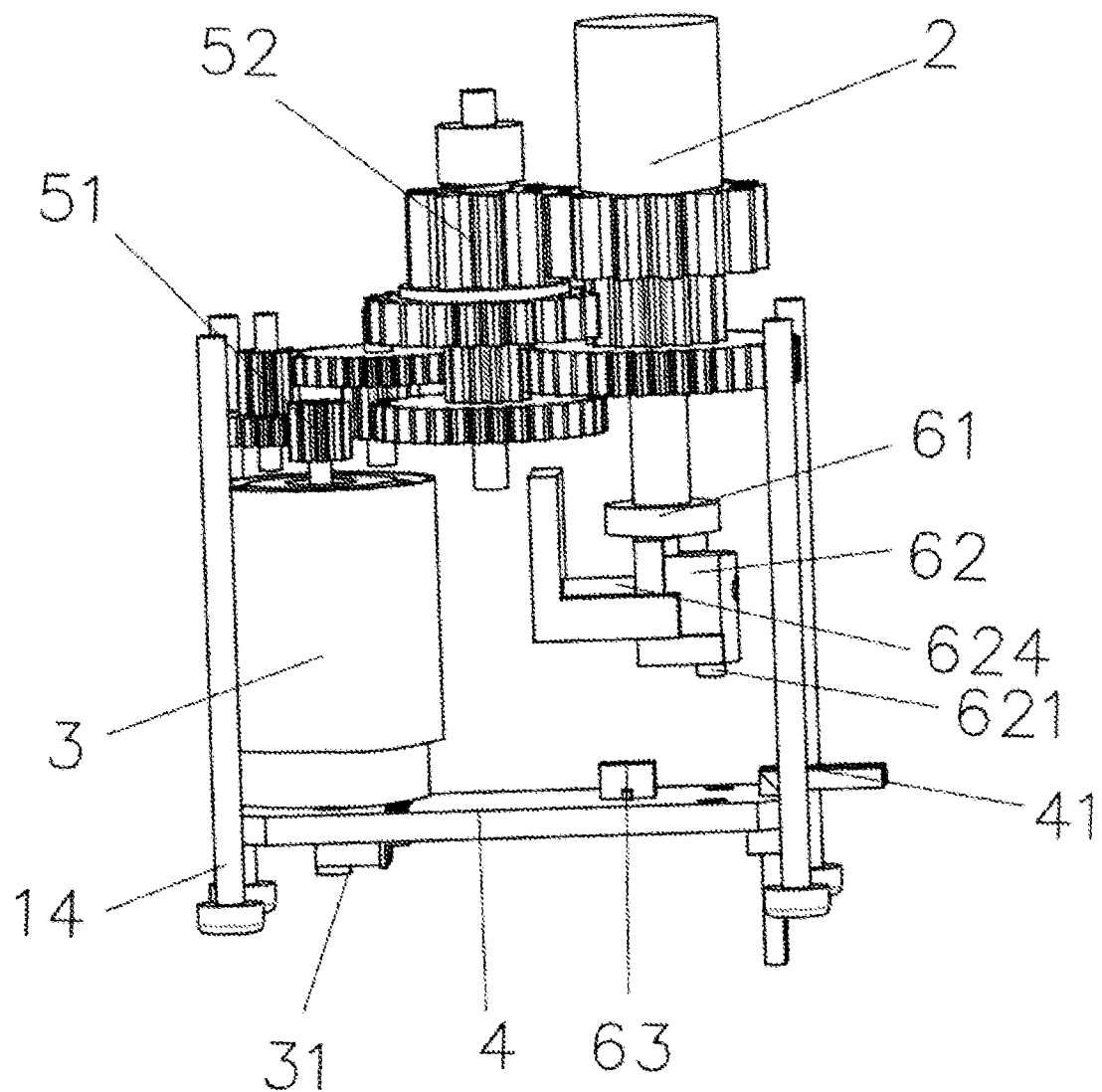
FIG. 3 is an internal structural view of this embodiment.
Figure 4:
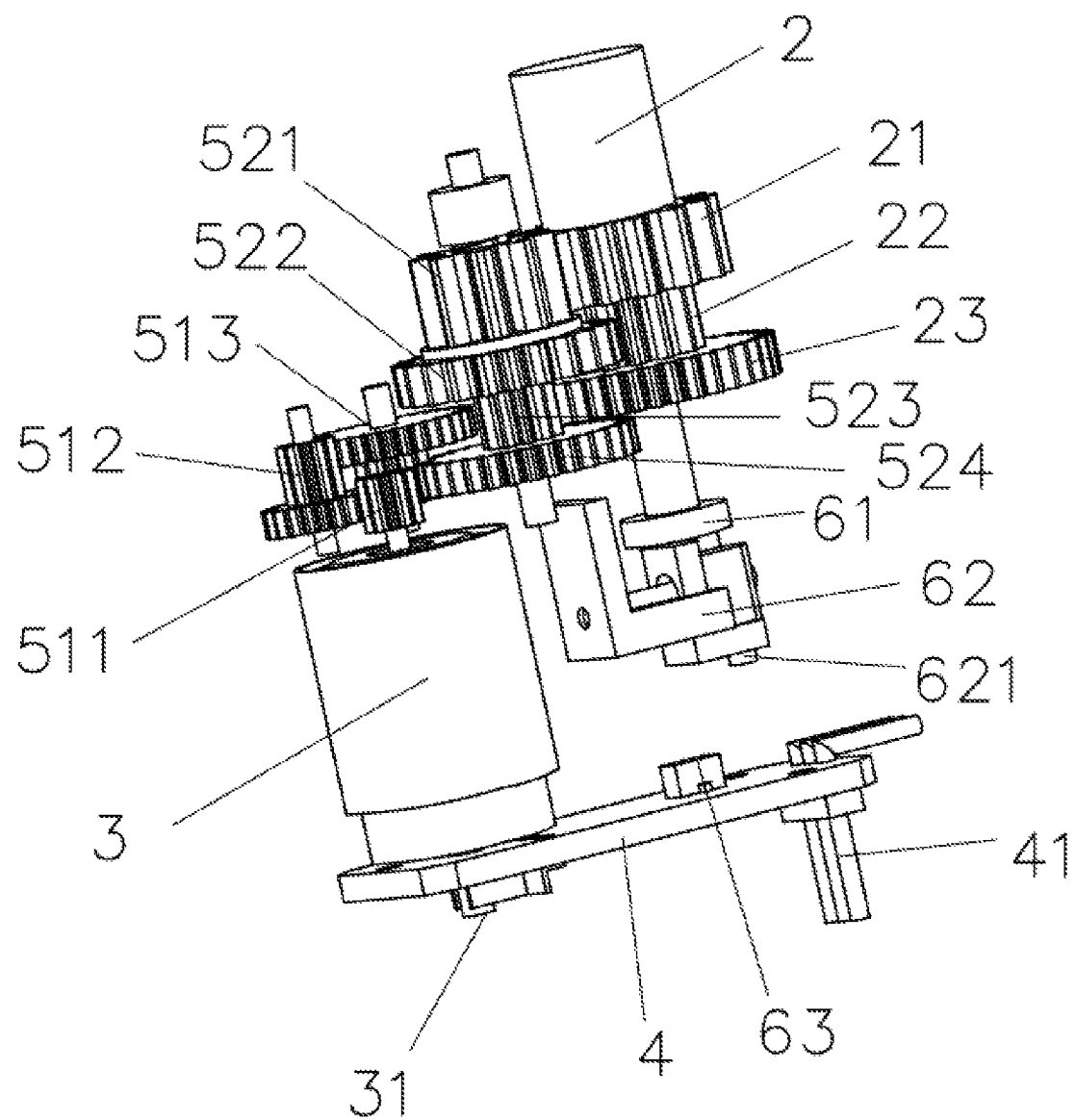
FIG. 4 is another internal structural view of this embodiment.
Figure 5:
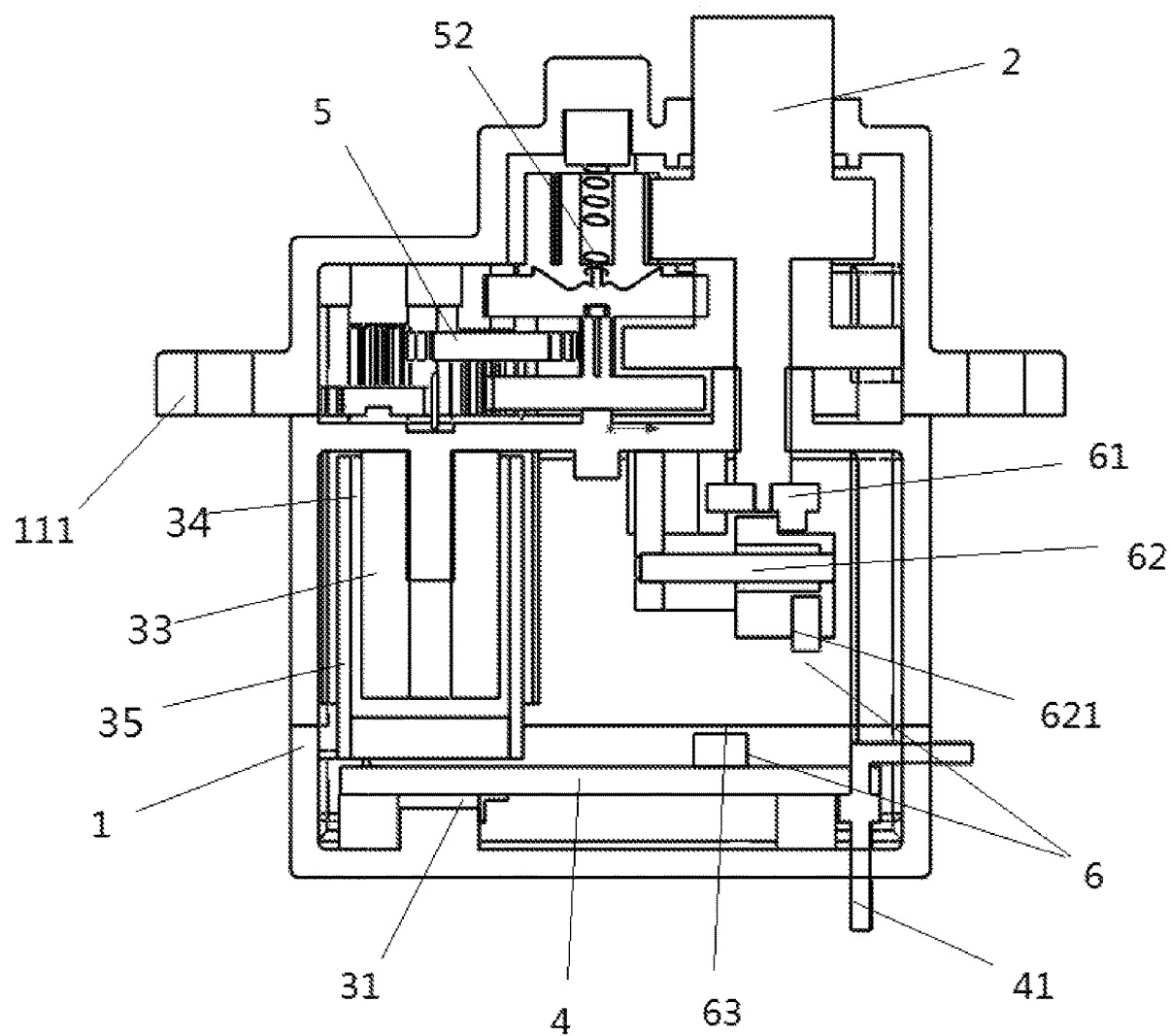
FIG. 5 is a sectional view of this embodiment;
in which:
1: housing; 11: upper cover; 111: extension portion; 12: middle cover; 13: lower cover; 14: stud; 2: output shaft; 21: eighth gear; 22: ninth gear; 23: tenth gear; 3: motor component; 31: motor brush piece; 32: rotating shaft; 33: magnet; 34: coil; 35: motor housing; 36: commutator; 4: PCBA circuit board; 41: signal and power connector; 5: speed reduction device; 51: speed reduction gear set; 511: first gear; 512: second gear; 513: third gear; 52: clutch; 521: fourth gear; 522: fifth gear; 523: sixth gear; 524: seventh gear; 6: position detection assembly; 61: cam; 62: toggle magnet seat; 621: magnet; 622: support block; 623: slider; 624: guide shaft; 625: telescopic spring; and, 63: Hall element.

With reference to FIGS. 1-5, the present disclosure relates to a high-precision miniature servo with a new variable reluctance and improved motor positioning, including a housing 1, an output shaft 2, and a motor component 3, a PCBA circuit board 4, a speed reduction device 5 and a position detection assembly 6 which are all mounted in the housing 1. The motor component 3 and the position detection assembly 6 are electrically connected to the PCBA circuit board 4, respectively. The speed reduction device 5 is in driving connection to the motor component 3, A positioning column hole for accommodating the motor component 3 is formed in the housing 1, the motor component 3 is directly mounted in the positioning column hole of the housing 1, and a motor brush piece 31 is directly machined on the PCBA circuit board 4. The speed reduction device 5 includes a speed reduction gear set 51 and a clutch 52 with a gear. The speed reduction gear set 51 is in driving connection to a rotating shaft 32 of the motor component 3, the speed reduction gear set 51 is meshed with the gear of the clutch 52, and the output shaft 2 is meshed with the gear of the clutch 52 through a gear. The position detection assembly 6 includes a cam 61, a toggle magnet seat 62 and a Hall element 63. The cam 61 is fixed to a lower end of the output shaft 2. The toggle magnet seat 62 is fixed to the cam 63. The Hall element 63 is directly machined in the PCBA circuit board 4. A magnet 621 is arranged on the toggle magnet seat 62. The output shaft 2 drives the toggle magnet seat 62 to move by the cam during its rotation, so that the magnet 621 moves in a linear direction above the Hall element 63 to realize position detection.

In this embodiment, the toggle magnet seat 62 includes a support block 622, a slider 623, a guide shaft 624 and a telescopic spring 625. An upper end of the slider 623 comes into contact with a bump at a lower end of the cam 61. An upper end of the support block 622 is fixed inside the housing 1. One end of the guide shaft 624 is connected to the support block 622, while the other end of the guide shaft is movably arranged in the slider 623. The telescopic spring 625 is sleeved on the surface of the guide shaft 624; and, one end of the telescopic spring 625 is elastically connected to the support block 622, while the other end of the telescopic spring is elastically connected to the slider 623. A clamping hole is formed in a lower end of the slider 623, and the magnet 621 is inserted and fixed in the clamping hole. During its rotation, the output shaft 2 pushes the toggle magnet seat 62 to do an elastic motion in a left-right direction by the cam 61, so that the magnet 621 moves in a linear direction above the Hall element 63, thus realizing the position detection by Hall sensing. In addition, a signal and power connector 41 is further provided on a side of the PCBA circuit board 4.

The speed reduction gear set 51 includes a first gear 511, a second gear 512 and a third gear 513. The first gear 511 is sleeved on the rotating shaft 32 of the motor component 3, the second gear 512 is meshed with the first gear 511, and the third gear 513 is meshed with the second gear 512, so as to realize speed reduction. A fourth gear 512, a fifth gear 522, a sixth gear 523 and a seventh gear 524 are successively arranged on the surface of the clutch 52 from the top down. The seventh gear 524 is meshed with the third gear 513. An eighth gear 21, a ninth gear 22 and a tenth gear 23 are successively arranged on the surface of the output shaft 2. The eighth gear 21, the ninth gear 22 and the tenth gear 23 are meshed with the fourth gear 521, the fifth gear 522 and the sixth gear 523, respectively. By meshing three sets of gears, the stability of the output shaft 2 is maintained. It is to be further noted that, in this embodiment, both the second gear 512 and the third gear 513 are double gears including a big gear and a small gear, the sixth gear 523 and the seventh gear 524 are a small gear and a big gear in the double gears, and the ninth gear 22 and the tenth gear 23 are a small gear and a big gear in the double gears, where the first gear 511 is meshed with the big gear of the second gear 512, and the small gear of the second gear 512 is meshed with the big gear of the third gear 513.

In this embodiment, the housing 1 includes an upper cover 11, a middle cover 12 and a lower cover 13 successively from the top down. The PCBA circuit board 4 is fixed in the lower cover 13, the motor component 3 and the position detection assembly 6 are arranged in the middle cover 12, and the speed reduction device 5 and the output shaft 2 are arranged in the upper cover 11. The upper cover 11, the middle cover 12 and the lower cover 13 are screwed and fixed by a stud 14 sequentially passing through the lower cover 13, the middle cover 12 and the upper cover 11. Extension portions 111 are further arranged on two sides of the upper cover 11, and mounting holes are formed in the surface of the extension portions 111.

In this embodiment, a current overload protection function is provided on in PCBA circuit board 4 by a software system, to realize automatic power-off in case of a current overload. A learning and repositioning function is provided in the PCBA. circuit board 4 by a software system, to enable learning of multiple times of positioning and storage of data for a next positioning.

Compared with the prior art, the present disclosure has the following characteristics.

1. With the cam 61, the toggle magnet seat 62, the telescopic spring 625 and the Hall element 63, the magnet 621 is allowed to move in a linear direction above the Hall element 63 to form a variable reluctance for detection. Here, a new position detection mode is formed by one magnet 621 and one Hall element 63. Compared with the conventional variable reluctances, the variable reluctance of the present disclosure has a longer service life, is lower in cost and is easier to machine.

2. The motor component 3 is directly assembled on the housing 1, so the cost and space are saved, and the difficulty in mounting and positioning a miniature motor is mainly solved.

3. The motor brush piece 31 and the Hall element 63 are directly machined on the PCBA circuit board 4, so that the problem on the difficulty and cost control of the conventional machining technology is solved.

4. By additionally providing a clutch 52 in the speed reduction device 5, the gear is protected from instantaneous impact damage.

5. By additionally providing a current overload protection function in the software, the speed reduction gear set 51, the motor component 3 and the PCBA circuit board 4 are protected from damage due to an overload.

6. By additionally providing a learning and repositioning function in the software, it is more intelligent.

7. The servo is miniaturized by the improved asset bling of the motor 3, the Hall element 63, the magnet 621 and other innovative designs.

It is to be further noted that, the cam 61 in this embodiment is preferably an eccentric wheel. In addition, the motor component 3 mentioned in this embodiment is a conventional motor component 3 composed of a motor brush piece 31, a rotating shaft 32, a magnet 33, a coil 34, a motor housing 35 and a commutator 36, and will not be repeated here. Unless otherwise explicitly specified and defined, the terms "connect", "fix", "arrange" and the like should be interpreted in a broad sense; and, for a person of ordinary skill in the art, the specific meanings of the terms in practices may be interpreted according to specific conditions.

The foregoing implementations are merely preferred implementations of the present disclosure and are not intended to limit the scope of the present disclosure. Various variations and improvements made to the technical solutions of the present disclosure by a person of ordinary skill in the art without departing from the design spirit of the present disclosure shall fall into the protection scope defined by the appended claims of the present disclosure.

The invention claimed is:

1. A high-precision miniature servo with a new variable reluctance and improved motor positioning, comprising a housing, an output shaft, and a motor component, a PCBA circuit board, a speed reduction device and a position detection assembly which are all mounted in the housing, the motor component and the position detection assembly being electrically connected to the PCBA circuit board, respectively, the speed reduction device being in driving connection to the motor component, wherein:

a positioning column hole for accommodating the motor component is formed in the housing, the motor component is directly mounted in the positioning column hole of the housing, and a motor brush piece is directly machined on the PCBA circuit board;

the speed reduction device comprises a speed reduction gear set and a clutch with a gear, the speed reduction gear set being in driving connection to a rotating shaft of the motor component, the speed reduction gear set being meshed with the gear of the clutch, and the output shaft being meshed with the gear of the clutch through a gear; and the position detection assembly comprises a cam, a toggle magnet seat and a Hall element, the cam being fixed to a lower end of the output shaft, the toggle magnet seat being fixed to the cam, the Hall element being directly machined in the PCBA circuit board, a magnet being arranged on the toggle magnet seat, and the output shaft driving the toggle magnet seat to move by the cam during its rotation so that the magnet moves in a linear direction above the Hall element to realize position detection.

2. The high-precision miniature servo with a new variable reluctance and improved motor positioning according to claim 1, wherein the toggle magnet seat comprises a support block, a slider, a guide shaft and a telescopic spring; an upper end of the slider comes into contact with a lower end of the cam; an upper end of the support block is fixed inside the housing; one end of the guide shaft is connected to the support block, while the other end of the guide shaft is movably arranged in the slider; the telescopic spring is sleeved on the surface of the guide shaft, and one end of the telescopic spring is elastically connected to the support block while the other end of the telescopic spring is elastically connected to the slider; a clamping hole is formed in a lower end of the slider; and, the magnet is inserted and fixed in the clamping hole.

3. The high-precision miniature servo with a new variable reluctance and improved motor positioning according to claim 1, wherein the speed reduction gear set comprises a first gear, a second gear and a third gear; the first gear is sleeved on the rotating shaft of the motor component; the second gear is meshed with the first gear, and the third gear is meshed with the second gear; a fourth gear, a fifth gear, a sixth gear and a seventh gear are successively arranged on the surface of the clutch from the top down; the first gear is meshed with the third gear; an eighth gear, a ninth gear and a tenth gear are successively arranged on the surface of the output shaft; and, the eighth gear, the ninth gear and the tenth gear are meshed with the fourth gear, the fifth gear and the sixth gear, respectively.

4. The high-precision miniature servo with a new variable reluctance and improved motor positioning according to claim 1, wherein a signal and power connector is further provided on a side of the PCBA circuit board.

5. The high-precision miniature servo with a new variable reluctance and improved motor positioning according to claim 1, wherein the housing comprises an upper cover, a middle cover and a lower cover successively from the top down; the PCBA circuit board is fixed in the lower cover; the motor component and the position detection assembly are arranged in the middle cover; the speed reduction device and the output shaft are arranged in the upper cover; and, the upper cover, the middle cover and the lower cover are screwed and fixed by a stud sequentially passing through the lower cover, the middle cover and the upper cover.

6. The high-precision miniature servo with a new variable reluctance and improved motor positioning according to claim 5, wherein extension portions are further arranged on two sides of the upper cover, and mounting holes are formed in the surface of the extension portions.

7. The high-precision miniature servo with a new variable reluctance and improved motor positioning according to claim 1, wherein a current overload protection function is provided in the PCBA circuit board by a software system, to realize automatic power-off in case of a current overload.

8. The high-precision miniature servo with a new variable reluctance and improved motor positioning according to claim 1, wherein a learning and repositioning function is provided in the PCBA circuit board by a software system, to enable learning of multiple times of positioning and storage of data for a next positioning.

\* \* \* \* \*